Oct. 15, 1968 C. MOWRY 3,406,293
METHOD OF DETERMINING COLOR USING COLOR MAPS
Filed May 17, 1965 2 Sheets-Sheet 1
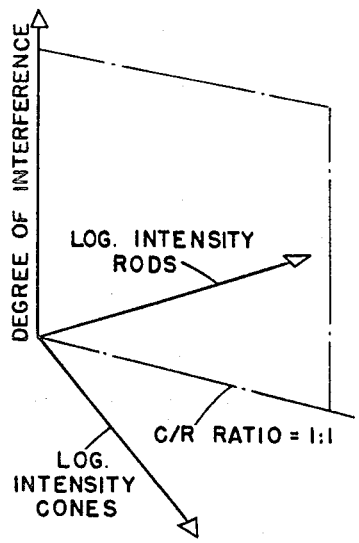
COLOR MAP DIMENSIONS
Fig. 1
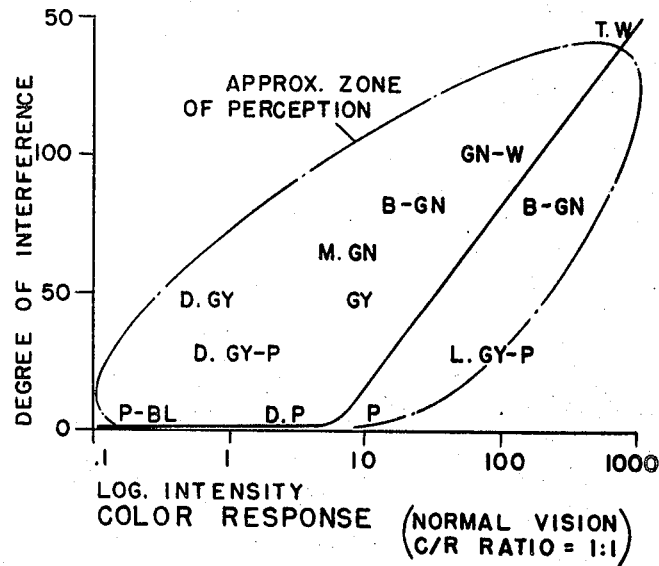
Fig. 2
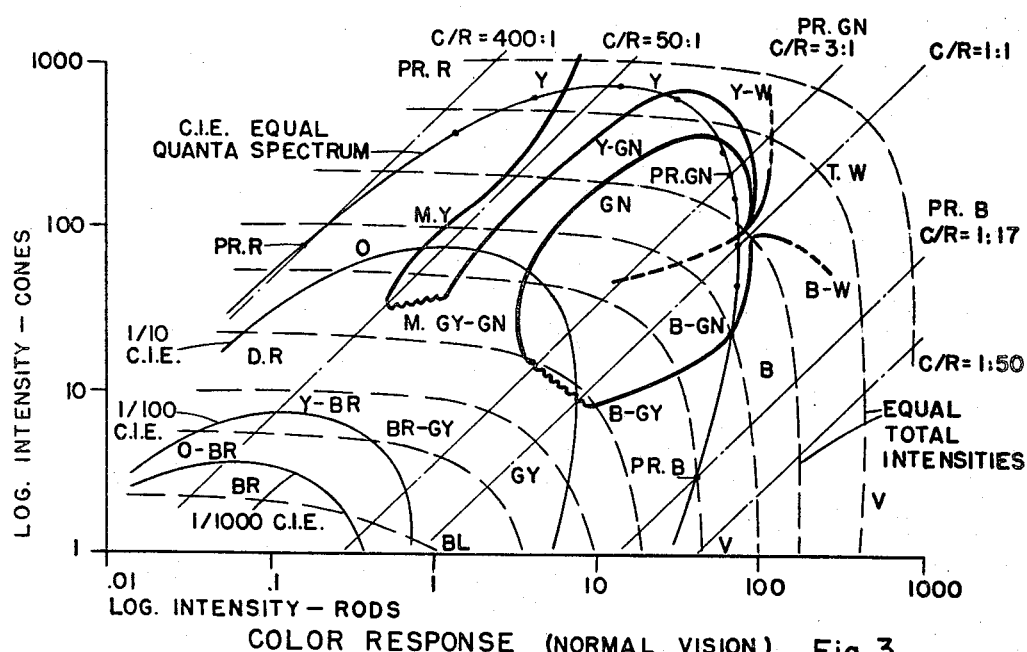
Fig. 3
ABBREVIATIONS
| | | | | | |
|---|---|---|---|---|---|
| B | BLUE | P | PURPLE | D. | DARK |
| BL | BLACK | R | RED | M. | MUDDY |
| BR | BROWN | V | VIOLET | PR. | PRIMARY |
| GN | GREEN | W | WHITE | T. | TRUE |
| GY | GRAY | Y | YELLOW | C | CONE |
| O | ORANGE | L. | LIGHT | R | ROD |
Fig. 4
INVENTOR.
CHRIS MOWRY
BY Knox & Knox Oct. 15, 1968 C. MOWRY 3,406,293
METHOD OF DETERMINING COLOR USING COLOR MAPS
Filed May 17, 1965 2 Sheets-Sheet 2

COLOR RESPONSE (RED-GREEN COLOR BLIND)

COLOR RESPONSE (YELLOW-BLUE COLOR BLIND)

INVENTOR.
CHRIS MOWRY
BY
Knox & Knox

United States Patent Office 3,406,293
Patented Oct. 15, 1968

3,406,293
METHOD OF DETERMINING COLOR USING COLOR MAPS
Chris Mowry, Valley Center, Calif., assignor to Gyro Engineering Corporation, San Diego, Calif., a corporation of California
Filed May 17, 1965, Ser. No. 456,387
2 Claims. (Cl. 250—226)

The present invention relates to information recording and retrieval and more specifically to a method of coding color response.

The commonly accepted systems for identifying colors are based on the fact that white light can be separated into various colors, which can be recombined to give white, particular emphasis being placed on red, green and blue as primary colors. A color can be identified as having a particular wavelength, but this system is accurate only under very precisely controlled conditions. For instance, it can be shown that light of a particular color as seen through a colored filter, if subjected to changes in intensity, appears to change in color. An increase in intensity will cause a color to become lighter or pale, while a decrease in intensity will produce darker shades. Under certain conditions it is possible to cause a visual shift to a different color by merely changing intensity. It is apparent, therefore, that intensity is an important factor in color response, while wavelength is not the sole criterium.

From the standpoint of visual reference, vision defects of individuals under different conditions will cause varying interpretations of colors. Definition of a color by wavelength, even at a specific light intensity, is thus not reliably accurate.

Accordingly, it is the primary object of this invention to provide a method of coding color response in such a manner that any color can be recorded in terms of definite values and accurately reproduced from those values under any conditions.

The invention is illustrated and the principles involved and the realtionships of the data are graphically set out in the accompanying drawings, in which:

FIGURE 1 is a diagrammatic representation of a three dimensional color map showing the relationship of the basic data;

FIGURE 2 is a map of normal color response as taken on one plane of FIGURE 1;

FIGURE 3 is a map of color response values for normal vision;

FIGURE 4 is a table of abbreviations used throughout the drawings;

Figure 5:
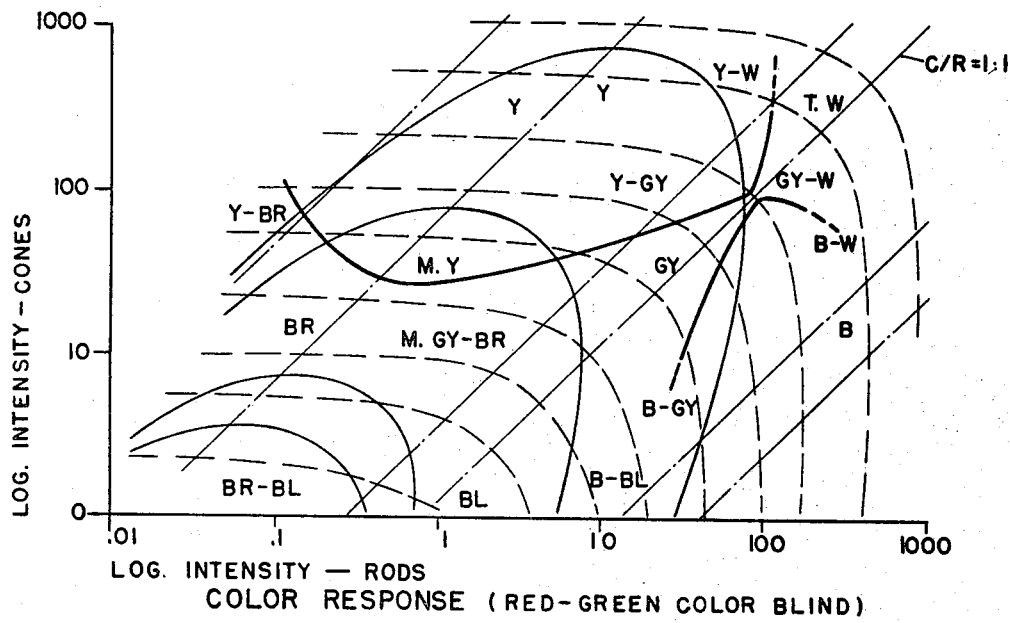
FIGURE 5 is a map of color response values for a red-green color blind subject.

Color response of the eye is the result of complex stimulation of photo-receptors in the eye by light energy, which can vary over a wide range in terms of three basic factors, to be defined herein. The light is considered as consisting of quanta of energy which must be absorbed by a photochemical receptor to produce a stimulus, the absorption for any single quantum being on an all or none basis, according to Einstein's theory of the photochemical process. When a quantum of energy is absorbed by a molecule there is a change in energy level in the molecule, and for each molecule there is a preferred step, or several steps, which result in selective absorption of those quanta with energies most suitable for the change. In other words, some molecules are more sensitive to specific energy characteristics than others. The absorption curve for a simple photochemical shows a peak at the preferred absorption range for that particular molecule, the width being a function of the degrees of freedom for the molecule in accepting energy whose characteristics vary from the preferred value. In many molecules absorbing quanta of various energy levels the basic reactions occurring are believed to be basically the same. Thus no single photo-receptor can differentiate as to wavelength, except indirectly on a relative intensity basis, and cannot discriminate wavelength changes from intensity changes.

It has been well established that there is a remarkable conformity between photopigment absorption curves and retinal absorption curves with threshold sensitivity curves and E.R.G. responses, so it is reasonable to assume that conversion of light stimulus to a neural stimulus occurs in a simple direct relationship to the stimulus. Therefore, there can be only one basic photo-pigment in a receptor. For a given type of photopigment the reaction of any molecule is believed to be always the same, regardless of the wavelength of light energy which triggers it. Thus the resulting stimulus to neural response cannot be distinguished as to wavelength, all triggered stimuli being, in effect, identical regardless of wavelength. This is supported by Einstein's theory, which shows that the photoconversion stimulus energy is independent of wavelength, so the neural stimulus must also be independent of wavelength.

Considering now two or more adjacent receptors, it can be considered that, in their neural responses, the receptors integrate their information, which can provide luminosity and spatial reference data. The specific neural interrelationship is not in question, but is mentioned merely to point out that, by integration, "$n$" receptors can provide more than "$n$" bits of information.

With a single receptor there is insufficient data provided for color discrimination but the one value which can be determined is "intensity," which is the first basic factor of the coding system.

When two receptors with different sensitivity curves, as in the cones and rods of the eye, are receiving light energy, it is possible to differentiate between the stimuli of the receptors. With two receptors whose absorption curves are significantly different and both curves substantially cover the visual spectrum, the combined response is theoretically all that is necessary to provide color response. This has been demonstrated by Edwin H. Land and others and agrees in concept if not in mechanics with the Hering theory of paired receptors. The important factor is the ratio of stimulation between the two receptors, referred to herein as the cone-rod ratio, or "$C/R$ ratio," which is the second basic factor of the coding system.

Due to the wave character of light the quanta do not arrive at a receptor at a constant rate or in a random manner, but occur in timed bursts or pulses of quanta, the frequency of the pulses varying inversely with wavelength. In any but pure monochromatic light there will be some "long" wavelength energy and some "short" wavelength energy with respect to an arbitrary neutral point in the visual spectrum. With two receptors having different spectral sensitivity curves, one will be affected more by long wavelength stimulation and the other more by short wavelength stimulation, and thus there is a difference in response depending on wavelength, although only indirectly. If the effect of a stimulus composed of a long wavelength and a short wavelength is compared to that of another stimulus, identical in intensity response but composed of a single intermediate wavelength, there exists a difference in timing response between the two stimuli, even though the intensity responses are equal. Since the two sensitivity curves overlap, there will be certain intermediate wavelengths which will stimulate both receptors substantially equally, with the same timing of quanta pulses for both. If one receptor reacts more quickly than the other, there will be differentiation, this being the case with cones and rods, since cones react more rapidly than rods. Also, two different wavelengths stimulating the two receptors according to their sensitivities will cause a differentiation due to the difference in frequency of quanta pulses in the two wavelengths. When the responses of the two receptors are combined there will be a measurable "degree of interference" between the responses, this being the third factor in the coding system. It is this third factor which has heretofore been neglected and even unrecognized in color analysis, particularly since the classic tricolor system has no provision for such a factor.

The interference may be more clearly understood by visualizing two intersecting highways on both of which traffic is moving. If there are very few vehicles, or the intensity is low, there will be few collisions or interferences regardless of the timing or frequency. At the other extreme, if traffic flow or intensity increases to the point where there is insufficient separation between the two flows to permit passage, there will be collisions or interferences regardless of frequency. On the other hand, if the timing or frequencies of the two streams of vehicles are properly related, there will be no interference at any intensity, until the above mentioned extreme intensity is reached. However, if the frequencies of the two streams of vehicles are in such a relation that gaps do not coincide properly, there will be interference regardless of intensity. Very broadly, the degree of interference can be considered as a beat frequency between the two wavelengths, which will be systematic over the major portion of the spectrum and will become more random toward the extremes of the spectrum. In actual practice, however, the interference will not be a simple beat frequency, since the sensitivities and response rates of the two receptors differ.

Two different receptors can measure the intensity and interference factors simultaneously, and differ in response to both intensity and timing, or interference. This data will provide all the necessary information for identifying a specific color. Thus while three or more colors may be necessary in a full color system to make all colors, only two types of receptors are required to provide the neural stimuli by which the eye perceives a color.

In the photochemical action in the eye, the photochemical material in the receptor, such as the rhodopsin in the rods, is acted upon by light energy to change chemically to complex breakdown products at higher energy levels. When the stimulating light decreases, the rhodopsin is reconstituted back to a lower energy level, the excess energy derived from the light induced change then providing the neural stimulus. At any steady state of illumination intensity there will be a certain mass equilibrium of rhodopsin and breakdown products. When the eye is dark adapted to a low light level, there will be more unaffected rhodopsin, but a high light level to which the eye becomes adapted will cause an excess of breakdown products. At any light level to which the eye is adapted, a change in light intensity will upset the mass equilibrium and cause a neural response. In dark adaptation the quantal efficiency is low and the rhodopsin is rapidly reconstituted, so maintaining a high available energy reserve. In the light adapted eye the quantal efficiency is high, the change in sensitivity being a logarithmic function. When the perceived light changes to a new steady state, the mass equilibrium will adjust to that level. If upon the substitution of one stimulus for another, no response occurs, the two stimuli can be considered equivalent. This is the theoretical basis for the objective colorimetric substitution experiments described hereinafter.

The sensitivity curves of cones and rods overlap for a considerable portion of the spectrum, but there is a region at each end where, for all practical purposes, only one receptor is effective. For ordinary fields and intensities these regions are mono-sensory blue on the short end and red on the long end of the spectrum. In the region of overlap and the interference between long and short components will be systematic, but outside the overlap and toward the extremes of the spectrum the interference will become increasingly random. With the two types of receptors it should then be possible, using stimuli at the mono-sensory ends of the spectrum, to match with suitable ratios and intensities all of the intermediate colors in the range where the two sensitivity curves overlap. Also, at the mono-sensory ends, it should be possible to match any color in that hue area by adjustment of intensity only, for the particular receptor.

The eye, then, can measure three basic values, (1) total intensity, (2) relative intensity as between two differential sensors, or the $C/R$ ratio and (3) degree of interference between differential sensors. The classic Young-Helmholtz theory considers three values as necessary for full color response, but these are all frequency values, with intensity not even taken into account.

FIGURE 1 of the drawings shows a three dimensional color map with intensity values for the cones and rods extending along orthogonal horizontal axes and degree of interference on a vertical axis. A reference plane parallel to the degree of interference axis is indicated in broken line at a position where the cone and rod intensities are equal, or the $C/R$ ratio is 1:1. All color values and responses can be plotted on this chart but, for simplicity, a two dimensional representation is used.

The color map of FIGURE 2 illustrates a normal vision color response, the solid line, as taken on the plane indicated in FIGURE 1, with a $C/R$ ratio of 1:1. It will be seen that the response remains in the purple-black and dark purple area until the intensity reaches a certain value and then, as intensity increases, rises through frays and greens to white. At very low intensities the neural system is not sufficiently loaded to register any systematic interference, the degree of interference increasing as the intensity rises, to a maximum at the neutral green region. As intensity increases further the neural system becomes overloaded to the extent that random interference blocks out the systematic interference which is present over the major portion of the sensitivity curve. Thus the measurable degree of interference rises from effectively zero at low intensity to a maximum, then falls again at very high intensities. The broken outline shows the approximate limits of perception of the human eye under the conditions indicated. Since the $C/R$ ratio is fixed the band of perception is limited and does not extend to the reds or blues.

Color response characteristics of a human eye with normal vision are shown in FIGURE 3. In this color map intensity perceived by the rods is the horizontal scale and intensity perceived by the cones is the vertical scale, the units being arbitrary. The dash lines extending across and curving down the map are each through points of equal intensity, while the diagonal broken lines show specific $C/R$ ratios to emphasize the differential intensity relationships. The light solid curve peaking near the top of the map is the C.I.E. equal quanta spectrum, which is internationally accepted and is usually the sole representation of color response on color maps related to wavelength. Other matching curves representing fractions of the C.I.E. response are given for reference. This basic map arrangement is repeated exactly in FIGURES 5 and 6 to maintain consistency of representation. Degree of interference is dependent on intensity and wavelength, or quanta pulse frequency, although wavelength is not a measurer factor, the various colors being indicated in their respective zones over the map. While represented in flat form, the map would actually follow a somewhat curved surface through the three dimensionaal form of FIGURE 1.

The heavy solid lines represent actual color response and can be seen to vary considerably from the C.I.E. spectrum, which is based on standardized ideal conditions. The color response curves were obtained from measurements, both objective and subjective, from many subjects. In the case of the red-green color blind response, shown in FIGURE 5, it has been found that the normal response of the common house fly is remarkably similar to that of a human eye with a red-green color blind defect. Thus for this case, objective measurements were made with a fly's receptors, in addition to subjective measurements from human subjects.

In the red-green color blind there is a neutral point at the 1:1 *C/R* ratio which is achromatic, denoting a balanced condition of cone-rod stimulus. All higher *C/R* ratios cause a response toward the yellow and all lower ratios cause a blue response. Total intensity increases shift the response toward white and intensity decreases move the response into grays and to black.

Figure 6:
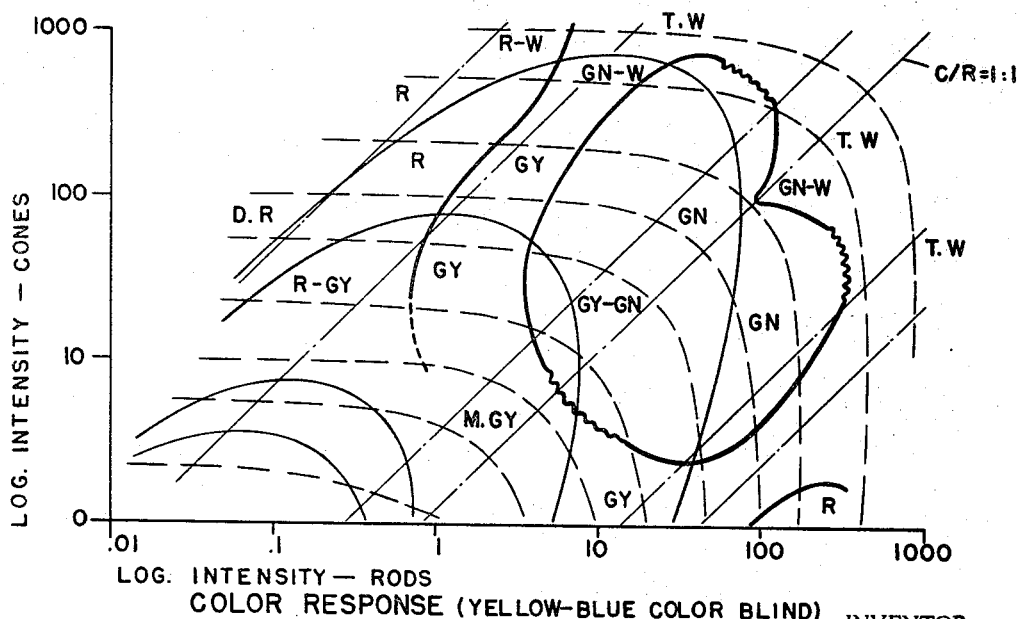
FIGURE 6 is a map of color response values for a yellow-blue color blind subject.

The yellow-blue color blind response of FIGURE 6 shows two regions of minimum degree of interference, one toward each side of the map, with two transition zones.

Comparison of the two defectives with the normal shows that the normal fills a color gap apparent in one defective with the exact color response found in the other defective for that particular point. It appears that the red-green color blind lacks the relative timing measurement means, while the yellow-blue color blind lacks the relative intensity determination. The normal has both of these faculties and all possess the total intensity measuring ability.

The map for the normal does not shown any achromatic areas except at very high or low intensities along the 1:1 *C/R* ratio line, because the map is prepared for a physical stimulus of certain single wave bands used in the tests. In actual practice many different wave bands would be involved.

To identify a color precisely, the requirement is for a proper balance in both the degree of interference and the relative intensities. The interference can be obtained from the red-green color blind map and the intensity ratio from the yellow-blue color blind. The stimulus is then determined so that it will be balanced with these measurements, by reference to the combined cone-rod intensity map of FIGURE 2, the result being an achromatic response. By way of examples, a red sensation is obtained from the eye when the cone to rod stimulation ratio is very high and the intensity is low, relative to the adaptation state of the eye and considering only the stimulus of interest. A yellow sensation is obtained when the cone to rod ratio exceeds the white balance ratio and total intensity is high, the wide ratio and high intensity balancing each other. When the cone to rod ratio is considerably less than one, a blue sensation occurs, total intensity being fairly low for primary blue.

It should be understood that the accompanying color maps are not intended to be sufficiently accurate for measurements to determine the values necessary to identify a specific color, but are prepared from test results sufficient to show the basic principles and feasibilty of the system. Comprehensive color maps, with only the pertinent data in graphical form, could be prepared from careful measurements made with actual receptors, and suitable increments applied to the axes of the map. Measurements could then be made directly to determine the characteristics of a color in the three basic terms as discussed herein. The color would be reproducible from that coded data under any conditions, while any complex combination of wavelengths can be reduced to the simple three factor coding equivalent.

The data can be recorded or presented in a manner most convenient for the intended use. For example, a Cartesian form can be used with the three factors presented graphically in a three axis relationship. Alternatively, the data could be in polar coordinate form with two factors directly indicated and the third factor, in this instance the degree of interference or timing characteristic, represented as a timing relationship between the two ordinates. These are merely two examples of suitable methods of recording the pertinent data.

In a fully developed system the data could be derived from photoelectric cells or the like exposed to a source of light of the particular color to be coded. By coupling the photoelectric cells to suitable indicating or readout means, the required values could be obtained in terms of voltages or any other increments, representing the intensity registered by each cell, the ratio of intensities between the two cells and the degree of interference between the two sensed stimulations. Suitable filters presently available could be used to provide the photoelectric cells with sensitivity curves matching those of the cones and rods in the human eye, or for any sensitivity curves which may be required, so that the proper comparison of stimuli in two sensors is obtained. The pertinent data can be used immediately or may be recorded in any suitable manner for reference purposes. Conversely, from tabulations of known or measured values, any color could be reproduced. It will be evident that the basic response characteristics are not necessarily limited to those of the human eye but, with suitably filtered receptors, could even be extended beyond the usual visual spectrum.

I claim:

1. A method of coding color response with respect to a pair of photo-receptors having different spectral sensitivity characteristics, comprising:

measuring the total intensity of a stimulus as perceived by the receptors;

measuring the relative intensities of the stimulus as perceived by the receptors individually;

measuring the randomness of the degree of interference between frequencies of long and short wave components of the stimulus, as perceived by the receptors;

and applying the measurements to appropriately scaled color maps to reproduce the color response characteristics of the photo-receptors in terms of the measured data, whereby measurements can be made from the maps to reproduce a color accurately for interpretation by the receptors.

2. A method of coding color response with respect to a pair of photo-receptors having different spectral sensitivity characteristics, comprising:

measuring the total intensity of the stimulus as perceived by a receptor;

measuring the relative intensities of the stimulus as perceived by each receptor individually;

measuring the randomness of the degree of interference between frequencies of long and short wave components contained in the stimulus, as perceived by the receptors;

and recording the measured values.

References Cited

"Photoelectric Color Difference Meter," by Richard S. Hunter, Journal of the Optical Society of America, vol. 48, No. 12, 985–995, December 1958.

Light, Colour, and Vision by Yves LeGrand, 1957, John Wiley and Sons, New York, N.Y., p. 213.

RALPH G. NILSON, *Primary Examiner.*

M. ABRAMSON, *Assistant Examiner.*